UNITED STATES PATENT OFFICE.

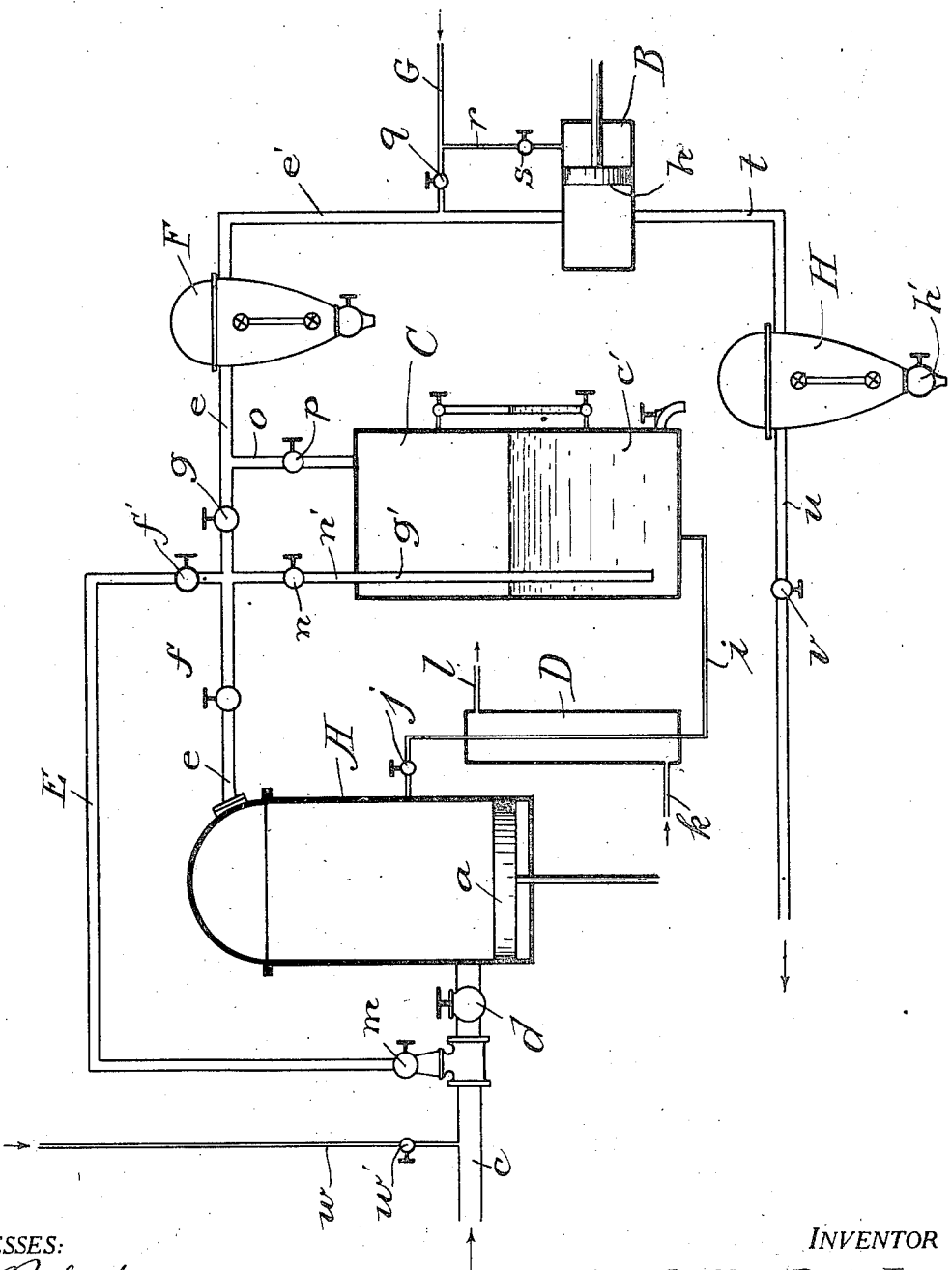

AUGUSTE JEAN PARIS, JR., OF BRADFORD, PENNSYLVANIA.

PROCESS OF SEPARATING AQUEOUS AND OTHER VAPORS FROM AIR AND GASES.

1,320,167.  Specification of Letters Patent.  Patented Oct. 28, 1919.

Application filed July 9, 1914. Serial No. 849,897.

*To all whom it may concern:*

Be it known that I, AUGUSTE JEAN PARIS, Jr., a citizen of the United States, residing in Bradford, county of McKean, and State of Pennsylvania, have invented a certain new and useful Process of Separating Aqueous and other Vapors from Air and Gases, of which the following is a specification.

This invention is a process of separating aqueous vapors and impurities from air, and covers, also, separating valuable vapors from various gases, such as coal gas, oil gas, water gas, natural gas, gases from the distillation of wood, lignite, etc., or from a mixture of any two or more of such gases, whereby the valuable vapors separated, as well as the residual gases, may be industrially utilized. The character of the vapors separated will depend, of course, upon the material treated. In the case of treating air, it is the purified dry air, at any suitable temperature, for use in ventilation and other industrial purposes, that is desired.

The vapors to be removed may be normal constituents of such gases, or may be ones with which such gases have been charged artificially, for the purposes hereinafter described. In this latter case, the vapors may be added to the gases, while said gases are at any desired pressure, either atmospheric pressure, or below or above the same.

In practically carrying out the process, the vapor carrying gas, if not normally under pressure, is subjected to pressure, and, as an incident, the customary heat of compression is developed. In this event, the compressed mixture may be cooled, in one well-known way or another, before subjecting said mixture to further treatment.

If it is desired to obviate the heat of compression, the compression may be effected in the presence of lubricating oil, glycerids, fish oil, castor oil, oleic acid, etc., these being heat preventive agents, and, when used, it is preferred to inject or spray them into the compression cylinder. In this way, the mixture can be compressed without any material elevation in temperature, and, if desired, the heat preventive agent may be so cooled or refrigerated prior to its introduction into the compression cylinder, as to counteract any rise in the temperature of the gases during compression. In fact, I may, if desired, by using a heat preventive agent at sufficiently low temperature, secure the compressed mixture at a temperature lower than its normal temperature prior to compression. The quantity of the heat preventive agent employed will depend, naturally, upon several conditions, but I have found that good results are secured by using from one to three gallons of the agent for each one hundred feet of gas compressed to a pressure of about two hundred pounds.

In some cases, I find it advantageous to cool the gas or gaseous mixture prior to compression. In other cases, however, I make no attempt to prevent the heat of compression, but, rather, effect the compression under such conditions as to produce a relatively high temperature in the compression cylinder, thereby resulting in the production of vapors which would not otherwise be formed, due to the cracking, or other changes, in the vapors of the mixture operated upon.

A salient feature of my process consists in effecting the expansion of the compressed gas or mixture under such conditions that the valuable vapors are liquefied and separated without solidification of aqueous or other vapors incident to the lowering of the temperature resulting from such expansion. The principal operation in this phase of the process consists in the injection or commingling of an agent into the mixture to be expanded, before or during expansion, preferably in the expansion cylinder, which so lowers the temperature at which any of the vapors therein would normally solidify, particularly water, as to preclude such solidification. By this manner of operating, I am enabled to obtain and separate all the valuable condensable vapors at the exhaust from the engine at low temperature and pressure.

Features of the process, other than those referred to, *ante*, will appear from the hereinafter detailed description.

In the accompanying drawing, I have illustrated a novel apparatus, of my invention, which may be used in practising the process of the present application, but it will be also understood that the process, or parts thereof, may be practised in apparatus quite distinct, at least from a specific standpoint, from the apparatus illustrated and described herein.

The said drawing is an elevation, parts thereof being shown in section, of an apparatus of the type to which reference has just been made.

Referring to the drawings, A is a cylinder of a gas compressor provided with a piston $a$, said cylinder having a main inlet $c$, controlled by a valve $d$, and an outlet $e$, provided with valves $f$ and $g$, leading to a separator F, the gas outlet from which $e'$ leads to an engine or other expansion cylinder B, provided with a piston $h$.

C is a tank for containing the heat preventive agent $c'$, which tank is provided with an outlet $i$, having a valve $j$, through which the agent may be introduced into the cylinder A. Pipe $i$ passes through a chamber D, having an inlet $k$, and an outlet $l$, which may be used to either cool or heat the agent passing from tank C, depending on the temperature at which it is desired to introduce said agent into the compression cylinder.

A pipe E, provided with valves $m$ and $f'$, connects the inlet pipe $c$ with pipe $e$, whereby when the several valves are properly positioned, communication may be established between inlet pipe $c$ and cylinder B, thus by-passing compressor A, and chambers C and D. This portion of the apparatus is used, as will be hereinafter more particularly described, when the gaseous mixture operated upon is under such pressure that it is unnecessary to compress the same in compression cylinder A.

The separator or trap F, of which there may be several, separates any readily condensable products from the gaseous mixture as it comes from the compression cylinder, or direct from inlet pipe $c$, and before it enters cylinder B. Pipe $e$ has an extension $g'$, provided with valve $n$, whereby the compressed mixture may pass from compressor A, through the liquid in tank C, whence the gas passes through valve $p$, pipe $o$, and pipe $e$ to the separator F, and thence, through pipe $e'$, to the expansion cylinder B. A pipe G, provided with valve $q$, leads to pipe $e'$, and has a branch $r$, provided with a valve $s$, leading to cylinder B, by means of which the agent is introduced into said cylinder which prevents solidification of water or other constituents in the cylinder B notwithstanding the low reduction in temperature within the cylinder.

Cylinder B has an exit $t$, leading to a condenser or separator H, wherein the various condensable products are separated from the gas and collected, whereupon the residual, purified air or gas escapes through pipe $u$, provided with valve $v$, and may be utilized as desired.

Instead of introducing the heat preventive agent from tank C into cylinder A, I may, in some cases, dispense with said tank and introduce the heat preventive agent direct into inlet pipe $c$, through pipe $w$, provided with valve $w'$.

Having described the apparatus in which my process may be practised, I will now briefly describe its mode of operation.

Assuming that we are operating on a mixture of gases and vapors at such low pressure that it is desirable to compress the same, said mixture is introduced through the pipe $c$ into compression cylinder A and compressed therein to the pressure desired, e. g., from fifty to two hundred pounds. The compressed mixture passes into the exit pipe $e$, the valves $f'$, $m$, $n$, $p$ being closed, and the valves $f$ and $g$ being open, to the separator F wherein vapors which have been condensed are separated. However, if the cooling agent $c'$ is being used, valves $m$, $f'$ and $g$ are closed and the valves $f$, $n$ and $p$ are open, with the result that the compressed mixture flowing from the cylinder A through the pipe $e$ is caused to pass through the tank C before passing to the separator F, and during the passage of this compressed mixture through the tank, the cooling agent which was used in the cylinder A is returned to the tank and deposited therein. The compressed mixture flows into pipe $e'$ and thence to the expansion cylinder B, where it is expanded, the force of expansion operating on piston $h$, from which power may be taken and utilized for any desired purpose. Just prior to the compressed mixture entering the cylinder B, or at least prior to its expansion in said cylinder, the agent e. g., glycerin or alcohol, or a mixture thereof, for reducing the temperature of solidification of the aqueous vapor, is introduced into the mixture either from pipe G through valve $q$, or through branch pipe $r$ and valve $s$. The expansion having taken place in the cylinder B, the mixture of gas and condensed vapors passes through pipe $t$ to separator H, where all the condensable vapors are separated from the gas and collected, and may be drawn off through valve $h'$ and used as desired. The gas or gases, freed from their condensable constituents, pass into pipe $u$, whence they may be taken and used as desired.

The valve $v$, in the pipe $u$, is, in some instances, an important factor in carrying out the process in that, by regulating the exit controlled thereby, I am enabled to control the velocity of the flow of gas, thereby facilitating the separation of vapors; second, it can be used to regulate the speed of the engine, operated by piston $h$, by causing a back pressure on the exhaust therefrom, and, third, by increasing the back pressure, the temperature of the gases is raised, and this temperature may be availed of to thaw out any ice or other substance which might accidentally become solidified in cylinder B, or the exhaust therefrom, without necessitating a stoppage of the engine.

In the event of operating on a gas containing some vapors, or a gas which is to be used merely as a carrier, and, in either case, it is desired to charge them artificially with vapors, such, e. g., as vaporized crude oil, the operations may be carried out as heretofore described, except that the crude oil desired may be introduced into inlet pipe c, through pipe w provided with valve w', the crude oil and gas thus entering the cylinder A, whereupon it is subjected to the operations previously described.

In the process first described, if it is desired to preclude the formation of the heat of compression in cylinder A, the heat preventive agent, e. g., lubricating oil, glycerids, etc., contained in tank C, may be forced through pipe i, chamber D and valve j, direct into cylinder A. In the event of injecting crude oil into the gas or gaseous mixture, however, I may, as an alternative to the heat preventive operation described, introduce said crude oil into tank C, thereby not only charging the gas or gaseous mixture with the vapors from the crude oil, but, also, utilizing said crude oil in lieu of the specified heat preventive agents, said crude oil having substantially the same function as the agents specified in precluding the rise of temperature in cylinder A. In a similar manner, any liquid which it is desired to purify, instead of the crude oil, may be introduced into chamber C and fed to cylinder A in the manner described.

In case the mixture of gas and vapor is at a sufficiently high pressure, the compression cylinder A may be dispensed with, in which event valves d, f, n and p are closed, and valves m, f' and g are open, thereby permitting the mixture to pass directly to separator F, whence it passes to expansion cylinder B in the manner heretofore described. If it is desired to mix said gases and vapors with other vapors, said vapors are introduced into inlet pipe c, through pipe w and valve w', the operations on the mixture then being the same as those just described.

In some instances, it may be desirable to refrigerate the liquid in tank C prior to its introduction into compression cylinder A, and this may be done by means of chamber D, through which a refrigerating agent may be passed. On the other hand, it may be desirable to introduce the liquid from chamber C into cylinder A at normal temperature, in which event no agent is allowed to flow through chamber D, unless some liquid for the purpose of removing the heat due to the compression, which heat had been absorbed by liquid c' in its passage through compressor A. If it is desired, however, to introduce the liquid c' into cylinder A at a somewhat high temperature, this can be done by using chamber D as a heating chamber; that is to say, a heating fluid may be allowed to flow through said chamber D, through its inlet k and its outlet l.

It will be observed that, when an agent c' is used in tank C and introduced into cylinder A with the gaseous mixture, and the mixture compressed and passed through pipes e and n' into tank C, the agent, which is mechanically converted into vapor in said cylinder, is reconverted into liquid form and deposited in said tank, and may be again reused. This agent may be continuously reused until it becomes so charged with impurities that it will not perform its intended functions. In the event the tank C is not used, however, separator F might be used to accomplish the same function, but, to avoid complication of the drawing, the return pipe from separator F to cylinder A is not shown. That is to say, instead of condensing or trapping out the agent in tank C, it can be trapped out or condensed in separator F.

It will have been noted that the separated, liquefied vapors are obtained on the exhaust side of the expansion cylinder, and this may be at any pressure desirable, but always at a lower pressure than the inlet to the expansion cylinder. In this manner of operating, certain volatile vapors can be removed from gas at a pressure as low as atmospheric. Separating the vapors under low pressures and relatively low temperatures is a decided advantage for the reason that the vapors condensed under the conditions specified do not entrain the dried gas or air, if the temperature is not sufficiently low to liquefy the said gas or air, as is the case when the separation is effected under high or comparatively high pressures.

The agent added to the mixture to preclude solidification is one, such as alcohol or glycerin, that will mix with the aqueous vapor present, thereby reducing the temperature at which such aqueous vapor would freeze or solidify.

Instead of introducing crude oil into main c through pipe w and valve w', I may similarly introduce any desired vapor or gas from which I may desire to recover liquefiable products. It will be understood, moreover, that the liquid, vapors, or gas introduced through pipe w, may also be introduced at some other point, such, e. g., as in the retort which produces the gases or vapors flowing into pipe c, or at such other point as is found convenient and practical, all of which will be readily understood by those skilled in the art.

Having thus fully described the invention, what I claim as new and desire to secure by Letters Patent is:—

1. The process of separating condensable hydrocarbons from gases, which consists in compressing the gas and then expanding it in the presence of a non-aqueous lubricant which permits of the liquefaction of the said hydrocarbons but precludes the solidification of any aqueous vapors present.

2. The process of separating condensable hydrocarbons from gases, which consists in compressing the gas in the presence of an agent which counteracts the heat of compression, then expanding it in the presence of an agent which permits of the liquefaction of said hydrocarbons but precludes the solidification of any aqueous vapors present, and then separating the thus liquefied hydrocarbons from the gas.

3. The process of separating condensable hydrocarbons from gases, which consists in compressing the gas, then permitting it to expand in an expansion cylinder provided with a piston whereby the force of the expansion may be utilized to generate power, and in the presence of an agent which so lowers the point of solidification of any of the products in the mixture that all the condensable hydrocarbons may be liquefied without solidification of any aqueous vapors present, and then separating said liquefied hydrocarbons from the gas.

4. The process of separating condensable hydrocarbons from gases, which consists in expanding the gas in the presence of a non-aqueous lubricant which permits of the liquefaction of said hydrocarbons but precludes the solidification of any aqueous vapors present.

5. The process which consists in introducing into gases containing liquefiable hydrocarbons an agent under pressure which reduces the temperature at which solidification of any of the constituents occurs, whereby the vapors may be liquefied and solidification precluded.

6. The process which consists in mixing vapors with a non-oxygen bearing gas, compressing the mixture, then cooling it by expansion while mixing therewith an agent which precludes freezing of any aqueous vapors present, whereby the vapors carried by the gas are liquefied, and then separating the liquids from the gas.

7. The process which consists in mixing vapors with a non-oxygen bearing gas, compressing the mixture in the presence of a heat preventive agent, cooling it by expansion in the presence of an agent which so reduces the temperature at which any of the vapors solidify that said vapors may be liquefied without solidification, and then separating said liquids from the gas.

8. The process which consists in compressing a gaseous mixture carrying hydrocarbon vapors, then expanding it in an expansion cylinder while so controlling the exhaust from said cylinder as to permit of the liquefaction of the said hydrocarbons while precluding the solidification of any aqueous vapors present, and then separating the liquefied hydrocarbons.

9. The process of treating compressed gas containing condensable hydrocarbons, which consists in expanding the gas in the presence of a non-aqueous agent which is miscible with the aqueous vapor in the gas and which lowers the temperature at which the aqueous vapor normally freezes in the absence of such agent.

10. The method of treating gas under pressure containing aqueous and other condensable vapors, which consists in adding an agent which mixes with and reduces the temperature at which the aqueous vapor freezes, expanding the mixture into a pipe or chamber provided with an exhaust valve, regulating said valve so as to produce a back pressure on the mixture, and separating the condensable vapors intermediate the expansion chamber and said valve.

11. The process of treating retort gases, such as coal gas, which consists in compressing them in the presence of a heat absorbing agent, and subsequently separating the liquefiable constituents therefrom by expansion and in the presence of glycerin and alcohol.

12. The process of treating hydrocarbon gas, which consists in compressing it in the presence of lubricating oil, and subsequently separating the condensable hydrocarbons therefrom.

13. The process of treating a compressed mixture of gases carrying aqueous and hydrocarbon vapors which consists in expanding said mixture in the presence of an agent which precludes the freezing of said aqueous vapors.

14. The process of treating a compressed mixture of gases carrying aqueous and hydrocarbon vapors which consists in expanding said mixture in the presence of alcohol and glycerin.

In testimony whereof I have signed my name to this specification in the presence of two subscribing witnesses.

AUGUSTE JEAN PARIS, Jr.

Witnesses:
F. S. FITZSIMONS,
A. A. CARNEY.